(12) United States Patent
Hollingsworth et al.

(10) Patent No.: US 6,263,759 B1
(45) Date of Patent: Jul. 24, 2001

(54) REMOVABLE, NON-TURNING HANDLEBAR GRIP

(75) Inventors: Joseph E. Hollingsworth, Redondo Beach; E. David Grimes, Norco, both of CA (US)

(73) Assignee: Valor Concept Marketing, Inc., Riverside, CA (US)

( * ) Notice: Subject to any disclaimer, the term of this patent is extended or adjusted under 35 U.S.C. 154(b) by 0 days.

(21) Appl. No.: 09/395,278

(22) Filed: Sep. 13, 1999

Related U.S. Application Data

(63) Continuation-in-part of application No. 08/876,361, filed on Jun. 16, 1997, now Pat. No. 6,035,742.

(51) Int. Cl.[7] .................................................. B62K 21/26
(52) U.S. Cl. ............................................................ 74/551.9
(58) Field of Search ............................... 74/551.8, 551.9

(56) References Cited

U.S. PATENT DOCUMENTS

| | | | |
|---|---|---|---|
| 568,024 | * | 8/1896 | Gorman ............................... 74/551.9 |
| 3,832,912 | * | 9/1974 | Edwards .............................. 74/551.8 |
| 4,535,649 | * | 8/1985 | Stahel ................................. 74/551.9 |
| 5,315,895 | * | 5/1994 | Kattus et al. ....................... 74/551.8 |
| 5,904,442 | * | 5/1999 | Takeda ................................ 403/392 |
| 5,934,154 | * | 8/1999 | Noel ................................... 74/551.9 |
| 6,035,742 | * | 3/2000 | Hollingsworth et al. ........... 74/551.9 |

* cited by examiner

*Primary Examiner*—David A. Bucci
*Assistant Examiner*—Vicky A. Johnson
(74) *Attorney, Agent, or Firm*—Edgar W. Averill, Jr.

(57) ABSTRACT

A handlebar grip assembly which can be removably attached to a handlebar. The grip assembly when attached will not rotate around the handlebar in use, and yet is easily removed from the handlebar. The handlebar grip assembly has an inner rigid shell with outwardly extending protrusions at each end. A pair of rigid clamps pass over the outwardly extending protrusions and tighten against the handlebar to hold the grip assembly in place. A soft, flexible grip portion is affixed to the outer surface of the inner rigid shell.

6 Claims, 2 Drawing Sheets

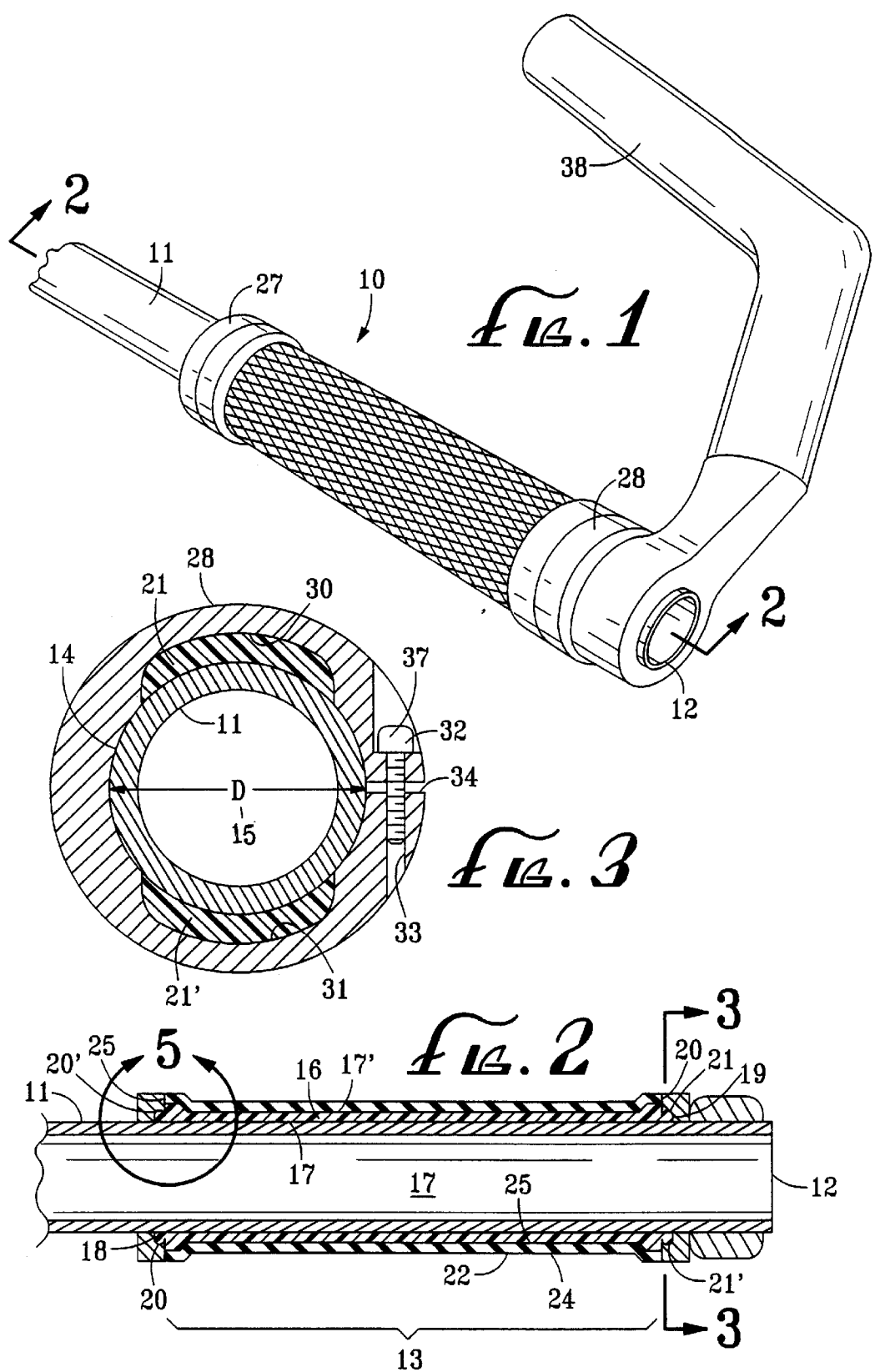

REMOVABLE, NON-TURNING HANDLEBAR GRIP

CROSS REFERENCE TO RELATED APPLICATIONS

This application is a continuation in part of applicant's patent application Ser. No. 08/876,361 filed Jun. 16, 1997, entitled "Handlebar Grip Assembly", now U.S. Pat. No. 6,035,742.

BACKGROUND OF THE INVENTION

The field of the invention is handlebar grips and the invention relates more particularly to handlebar grips which are held to the handlebar in such a way that they do not turn during use. Such handlebar grips are used on bicycles, all-terrain vehicles (ATVs), watercraft and snowmobiles. Handlebar grips, particularly for use on mountain bikes, are preferably soft on the outside so that they can be held without irritating the rider's hands over rough terrain. However, soft grips are often difficult to adhere to the handlebars without turning and it is advantageous that the handlebar grips do not turn with respect to the handlebar.

Various designs have been patented in an attempt to provide a securely held soft grip. One such design is shown in the Kuipers, et al. U.S. Pat. No. 5,280,735. This patent shows a two-piece slip-resistant grip which has an outer nylon lattice housing member with two end clamps. This lattice and end clamp assembly is placed over a softer inner sleeve which extends through the openings in the lattice and is clamped in place by the end cap and flanged end. This assembly is limited to a design where the hand contacting portion is in the shape of diamonds which pass through the lattice. Also, this grip results in the soft inner portion contacting the handlebar and with extended time the soft portion tends to form a bond with the handlebar and is very difficult to remove.

U.S. Pat. No. 3,344,684 to Steere, Jr., et al., shows a handlebar grip which has an inner portion with a transparent or translucent outer portion adhered thereto. The inner portion is slipped on the handlebar without any tightening means. Another two-part grip is shown in U.S. Pat. No. 4,416,166 to Jannard, et al. which has a two-part grip having an outer sleeve fitted over an inner sleeve. These two parts are interlocked by their matching designs.

U.S. Pat. No. 4,535,649 shows a foam surfaced handlebar grip which has a foam sleeve which is held over a hard polymer tube by an end cap and a coupling member. A cork handlebar grip is shown in U.S. Pat. No. 605,626 to Blanchard, Jr. This patent utilizes a slotted tapered pipe which has a nut at each end which captures the cork grip portion.

BRIEF SUMMARY OF THE INVENTION

It is an object of the present invention to provide handlebar grips which are soft and comfortable for the rider to hold and yet will not turn around the handlebar during riding, and still further, can be easily removed for replacement when desired.

The present invention is for a handlebar grip assembly removably attached near an end of a handlebar. The handlebar has a pair of grip receiving lengths adjacent each end. A handlebar grip assembly is removably affixed about each of the grip receiving lengths of the handlebar. The handlebar grip assembly comprises an inner rigid shell having an inner surface to slide over one of the pair of grip receiving lengths of the handlebar. At at least one of the ends the rigid shell has a lengthwise protrusion extending outwardly from the inner surface and radially outwardly to form a curved protrusion from the at least one end of the rigid shell. An outer flexible grip has an inner surface affixed to the outer surface of the inner rigid shell and has a soft preferably textured outer surface which is gripped by the rider. At least one rigid clamp has an inner gripping surface into which is formed at least one shell protrusion receiving recess and the rigid clamp has means for tightening the clamp against the handlebar outer surface and against the at least one lengthwise protrusion sufficiently so that the clamp when tightened will hold the handlebar grip assembly in a non-turning manner on the handlebar. The clamp also has means for loosening the clamp from the handlebar so that the handlebar grip assembly can be removed from the handlebar. Preferably, there are two protrusions at each end of the handlebar of the rigid shell of the handlebar to securely hold the handlebar grip assembly to the handlebar.

BRIEF DESCRIPTION OF THE DRAWINGS

FIG. 1 is a perspective view of an end portion of a handlebar covered with the handlebar grip assembly of the present invention and also including a bar end clamped at the end of the handlebar.

FIG. 2 is a cross-sectional view taken along line 2—2 of FIG. 1.

FIG. 3 is a cross-sectional view taken along line 3—3 of FIG. 2.

DESCRIPTION OF THE PREFERRED EMBODIMENTS

Figure 4:
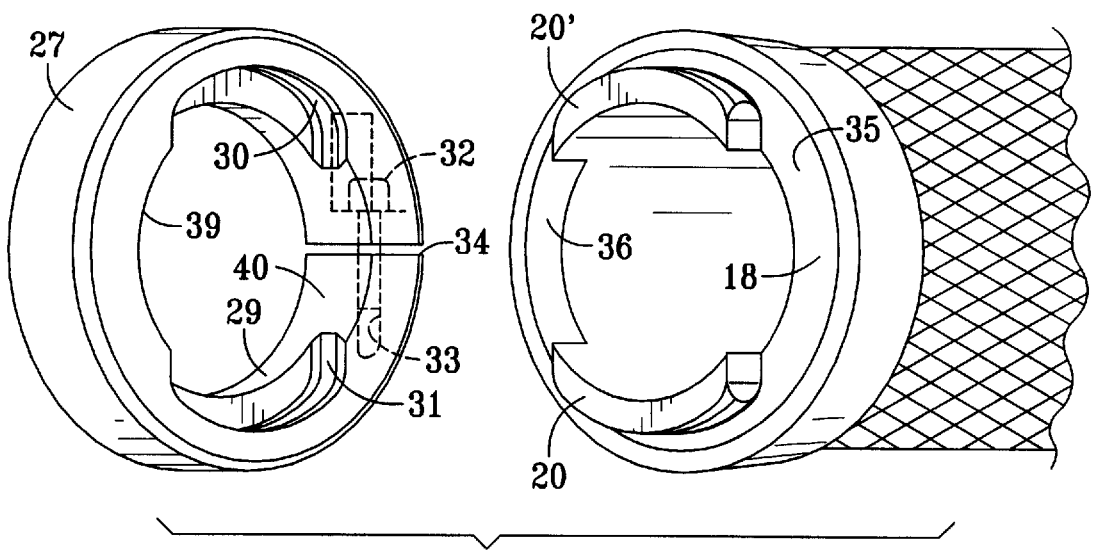
FIG. 4 is an exploded perspective view of one end of the grip assembly and an inner end of a clamp of FIG. 1.

A handlebar 11 has an outer end 12 and forms one-half of a typical handlebar. A handlebar grip 10 is affixed along a grip receiving length 13 (shown in FIG. 2) of handlebar 11. Grip 10 is secured along the cylindrical outer surface 14 along grip receiving length 13. The grip receiving length has an outside diameter 15. The handlebar grip 10 has an inner rigid shell 16 which has an inner surface 17 which slides over the cylindrical outer surface 14 of handlebar 11. Inner rigid shell 16 has an outer surface 17', a first end 18 and a second end 19. A pair of lengthwise protrusions 20 and 20' are formed at the first end 18 of the inner rigid shell and a pair of lengthwise protrusions 21 and 21' are formed at the second end 19 of the inner rigid shell. An outer flexible grip 22 is secured to the outer surface 17' of inner rigid shell 16. Outer flexible grip 22 has an inner surface 23 which is preferably secured by an adhesive to outer surface 17'. The outer surface 24 of the outer flexible grip 23 is preferably knurled or otherwise covered with a pattern which assists in the holding of the grip. Outer flexible grip 22 has a first end 25 and a second end 26.

The inner rigid shell 16 is secured to the handlebar 11 by a pair of rigid clamps namely a rigid inner clamp 27 and an outer rigid clamp 28. The outer rigid clamp 28 is shown in cross-sectional view in FIG. 3 where the outside diameter D of the handlebar 11 is indicated. It can also be seen that the lengthwise protrusions 21 and 21' are held within a pair of recesses 30 and 31 of outer clamp 28. This interconnection is best understood by viewing FIG. 4 which shows inner rigid clamp 27 and where the shell protrusion receiving recesses 30 and 31 can be clearly seen. These are concave as shown best in FIG. 5 and capture the protrusions 20 and 20' so that one clamp can hold the handlebar grip on the handlebar since it cannot slide out of the clamp 27 when clamp 27 is tightened. This gripping action is shown best in FIG. 5 of the drawings.

The rigid clamps may be held to the handlebar in various ways, but one such way is a slit 34 shown in FIGS. 3 and 4. An Allen screw 32 spans slit 34 and is threaded into a threaded opening 33 on the other side of slit 34.

In use, the inner and outer clamps 27 and 28 are placed over the protrusions 20 and 20' and 21 and 21'. This assembly has been slid over the end 12 of the handlebar 11 and the two rigid clamps 27 and 28 are tightened by tightening Allen screws 32. One advantage of the grip assembly of the present invention is that it can be tightened away from the end 12 of handlebar 11 which permits the tightening of bar end 38 past the outer rigid clamp 28. This is possible since the handlebar is not being held on by an insert passed into the end 12 of the handlebar as are many other clamps.

The inner rigid shell is preferably fabricated from a durable and impact resistant polymer such as glass filled polypropylene. Of course, the term "rigid" is a relative one. Glass filled polypropylene has some flexibility, but, compared to the grip elastomer, is considered rigid. The "rigid" claimps are preferably made of aluminum which is considerably more rigid than glass filled polypropylene. The bicycle grip is preferably fabricated from a relative soft elastomer such as a plasticized rubber of the type sold under the trademarks "J. Von," "Krayton," and "Starflex" having a hardness of typically 15 durometer.

Figure 5:
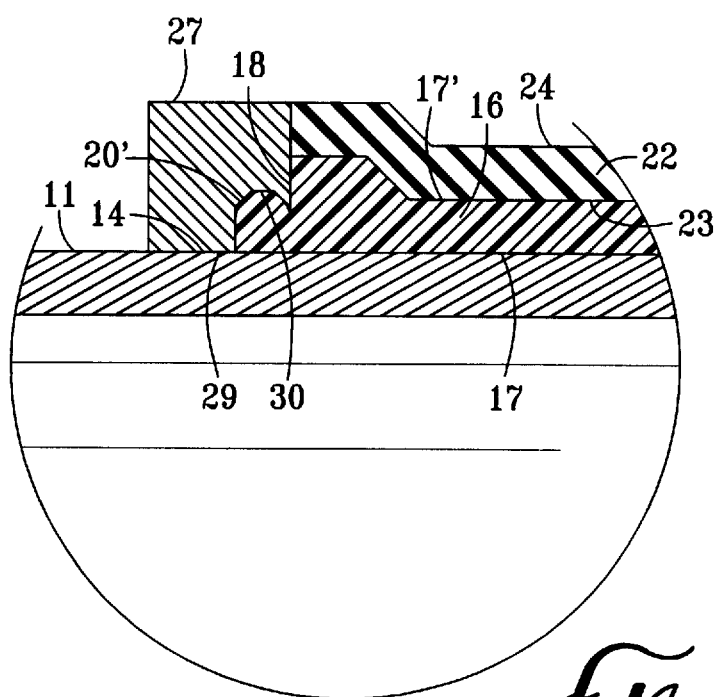
FIG. 5 is a cross-sectional view taken along line 5—5 of FIG. 2.

As can be seen in FIG. 5, rigid clamp 27 not only captures protrusion 29 with recess 30, but also clamps against the surface of handlebar 11 along the inner gripping surface 29 of rigid clamp 27. This metal clamp to metal handlebar provides a very secure clamping action against the handlebar without unduly compressing inner rigid shell 16 or its protrusions.

Furthermore, there are two circumferential portions 39 and 40 on each rigid clamp which also contact the outer surface 14 of handlebar 11. This further helps to secure the rigid clamps to the handlebar and thereby secure the inner rigid shell thereto. There is, of course, two pairs of spaces 35 and 36 between protrusions 20 and 20' as shown in FIG. 4, which permit the full contact at portions 39 and 40 of the rigid clamp. The result is a pair of handlebar grips which are very securely affixed to the handlebar and yet, can be rapidly removed by loosening Allen screws 32 and sliding off the handlebar and replacing it with another handlebar quickly if desired. If there is a bar end 38 used, this would also have to be removed.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A handlebar grip assembly (10) removably attached near an end (12) of a handlebar (11) which grip assembly (10) will not rotate around said handlebar (11) in use and yet is easily removed from the handlebar, said handlebar grip assembly (10) and handlebar (11) combination comprising:

a handlebar (11) having a pair of grip-receiving lengths (13) adjacent each end (12), each of said pair of grip-receiving lengths (13) having a cylindrical outer surface (14) with a grip length outside diameter (15);

a handlebar grip assembly (10) removably affixed about each of said pair of grip-receiving lengths (13), said handlebar grip assembly (10) comprising:

an inner rigid shell (16) having an inner surface (17) shaped to slide over one of said pair of grip-receiving lengths (13) and an outer surface (17'), said inner rigid shell (16) having a first end (18) and a second end (19), at least one of said first end (18) and second end (19) having at least one lengthwise protrusion (20, 20', 21, 21') extending longitudinally from the inner surface (17) and radially outwardly to form a curved protrusion from said at least one of said first end (18) and said second end (19). said at least one lengthwise protrusion (20, 20', 21, 21') extending circumferentially only part way around said at least one of said first end and said second end, so that there is a space (36) adjacent said at least one lengthwise protrusion;

an outer, flexible grip (22) having an inner surface (23) affixed to the outer surface (17') of said inner rigid shell (16) and an outer surface (24) a first end (25) and a second end (26); and at least one rigid clamp (27, 28) having an inner gripping surface (29) into which is formed at least one shell-protrusion-receiving recess (30, 31) and said at least one rigid clamp (27, 28) having means for tightening (32, 33, 34) against said handlebar outer surface (14) and against said at least one lengthwise protrusion (20, 20', 21, 21') and against said handlebar outer surface along said space (36) sufficiently so that the at least one rigid clamp (27, 28) will, when tightened, hold said handlebar grip assembly (10) in a non turning manner on said handlebar (11) and said at least one rigid clamp further having means for loosening from against said handlebar (11) so that the handlebar grip assembly (10) can be removed from the handlebar and yet while the at least one rigid clamp (27, 28) is tightened, the handlebar grip assembly (10) will not rotate around the handlebar (11).

2. The handlebar grip assembly (10) of claim 1 wherein said inner rigid shell (16) has two lengthwise protrusions (20, 21) at said first end (18) with a pair of spaces (35, 36) between the protrusions.

3. The handlebar grip assembly (10) of claim 1 wherein there is at least one lengthwise protrusion (20, 20', 21, 21') at each of said first (18) and second (19) ends.

4. The handlebar grip assembly (10) of claim 1 wherein said means for tightening (32, 33, 34) said at least one rigid clamp (27, 28) comprises a slit (34) formed radially in the at least one rigid clamp (27, 28) and a tightening screw (32) having a head (37), said screw spanning said slit and a threaded portion (33) on the opposite side of said slot (34) as said head (37) whereby the tightening of the screw reduces the width of the slit and forces the rigid clamp against the at least one lengthwise protrusion (20, 20', 21, 21').

5. The handlebar grip assembly (10) of claim 1 wherein said inner rigid shell (16) is fabricated from glass filled polypropylene.

6. The handlebar grip assembly (10) of claim 1 wherein said at least one rigid clamp (27, 28) is fabricated from aluminum.

* * * * *